(12) United States Patent
Hojo

(10) Patent No.: US 12,284,438 B2
(45) Date of Patent: Apr. 22, 2025

(54) IMAGE PROCESSING DEVICE, IMAGE PROCESSING METHOD AND NON-TRANSITORY COMPUTER-READABLE RECORDING MEDIUM

(71) Applicant: JVCKENWOOD Corporation, Yokohama (JP)

(72) Inventor: Yu Hojo, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 119 days.

(21) Appl. No.: 18/182,220

(22) Filed: Mar. 10, 2023

(65) Prior Publication Data

US 2023/0283898 A1    Sep. 7, 2023

Related U.S. Application Data

(63) Continuation of application No. PCT/JP2021/020802, filed on Jun. 1, 2021.

(30) Foreign Application Priority Data

Sep. 17, 2020  (JP) ................ 2020-156502

(51) Int. Cl.
*H04N 23/68*  (2023.01)
*G06T 7/20*  (2017.01)

(52) U.S. Cl.
CPC ........... *H04N 23/6812* (2023.01); *G06T 7/20* (2013.01); *G06T 2207/20221* (2013.01)

(58) Field of Classification Search
CPC .......... H04N 23/6812; H04N 23/6811; H04N 23/683; H04N 23/61; H04N 23/68;
(Continued)

(56) References Cited

U.S. PATENT DOCUMENTS

| 8,477,200 B2 * | 7/2013 | Fujita | G03B 5/00 |
| | | | 348/208.13 |
| 2012/0106869 A1 * | 5/2012 | Machitani | H04N 23/6811 |
| | | | 382/284 |

(Continued)

FOREIGN PATENT DOCUMENTS

| EP | 1223083 A1 | 7/2002 |
| EP | 2219364 A1 | 8/2010 |
| JP | 2016042662 A | 3/2016 |

OTHER PUBLICATIONS

European Extended Search Report from EP Application No. 21868952.9 mailed Feb. 19, 2024, 9 pages.

(Continued)

*Primary Examiner* — Albert H Cutler
(74) *Attorney, Agent, or Firm* — Shih IP Law Group, PLLC

(57) ABSTRACT

An object detection unit detects an object of interest from within frames of video acquired from an image capturing unit. A vector strength adjustment unit adjusts the strength of a correction vector for cancelling out shake caused by vibration applied to the image capturing unit. A cutout position determination unit determines a cutout position for cutting out an image of a predetermined size from each frame of the acquired video. The cutout position determination unit moves the cutout position in accordance with the correction vector and separately determines an object cutout position and a background cutout position according to the strength of the correction vector. An image composition unit combines image data of the object cut out from the object cutout position with image data of a background cut out from the background cutout position excluding the object.

5 Claims, 9 Drawing Sheets

(58) Field of Classification Search
CPC ............... H04N 23/682; H04N 23/684; H04N 23/6842; H04N 23/6845; H04N 25/443; G06T 7/20; G06T 2207/20221
See application file for complete search history.

(56) References Cited

U.S. PATENT DOCUMENTS

2018/0322638 A1* 11/2018 Sano ..................... G06T 7/238
2020/0036895 A1 1/2020 Midorikawa et al.

OTHER PUBLICATIONS

International Preliminary Report on Patentability (I) from International Application No. PCT/JP2021/020802 mailed Mar. 21, 2023, 8 pages.
International Search Report from International Application No. PCT/JP2021/020802 mailed Aug. 24, 2021, 4 pages.
International Search Report from International Application No. PCT/JP2021/020801 2mailed Aug. 24, 2021, 4 pages.
Office Action from EP Application No. 21868952.9 mailed Oct. 22, 2024, 5 pages.

* cited by examiner ined alike in several Figures in which:
IMAGE PROCESSING DEVICE, IMAGE PROCESSING METHOD AND NON-TRANSITORY COMPUTER-READABLE RECORDING MEDIUM

CROSS REFERENCE TO RELATED APPLICATION

This application is a Continuation of International Application No. PCT/JP2021/020802, filed on Jun. 1, 2021, which in turn claims the benefit of Japanese Application No. 2020-156502, filed on Sep. 17, 2020, the disclosures of which Application is incorporated by reference herein.

1. Field

The present invention relates to an image processing device, an image processing method and a non-transitory computer-readable recording medium that process each frame of video captured by an image capturing unit.

2. Description of the Related Art

BACKGROUND

Cameras equipped with an electronic image stabilization feature are widely used. The electronic camera shake correction feature adaptively shifts the range of angle of view to be cut out from an image-capturing range so as to cancel out camera shake, thereby generating an image with a reduced blur. In electronic camera shake correction, control is performed such that the position of a subject within the angle of view is fixed as much as possible. However, when the viewpoint moves due to the movement of the camera, the compositional arrangement within the angle of view changes, and the appearance of the positional relationship between the object and the background changes.

Patent Literature 1 discloses a technique of combining parallax images obtained by imaging a subject space from different viewpoints so as to synthesize an image close to the image before the viewpoint change. However, this technique requires an imaging element having multiple pixels for one microlens, which complicates the optical system.

[Patent Literature 1] Japanese Patent Application Publication No. 2016-42662

SUMMARY

An image processing device according to an aspect of the present embodiment includes: a video acquisition unit that acquires video captured by an image capturing unit; a movement amount identification unit that identifies the amount of movement of the image capturing unit that is based on vibration applied to the image capturing unit based on an output signal from a sensor for detecting vibration applied to the image capturing unit or a difference between frames of the acquired video; an object detection unit that detects an object of interest from within frames of the acquired video; a distance identification unit that identifies the distance from the image capturing unit to the object based on an output signal from a sensor for measuring a distance and the size of the object in a frame; a vector strength adjustment unit that adjusts the strength of a correction vector for cancelling out shake caused by the vibration; a cutout position determination unit that determines a cutout position for cutting out an image of a predetermined size from each of the frames of the acquired video and that moves the cutout position in accordance with the correction vector and separately determines an object cutout position and a background cutout position according to the strength of the correction vector; and an image composition unit that combines image data of the object cut out from the object cutout position with image data of a background cut out from the background cutout position excluding the object.

Optional combinations of the aforementioned constituting elements and implementations of the present embodiments in the form of apparatuses, methods, systems, recording mediums, and computer programs may also be practiced as additional modes of the present embodiments.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION

The invention will now be described by reference to the preferred embodiments. This does not intend to limit the scope of the present invention, but to exemplify the invention.

Figure 1:
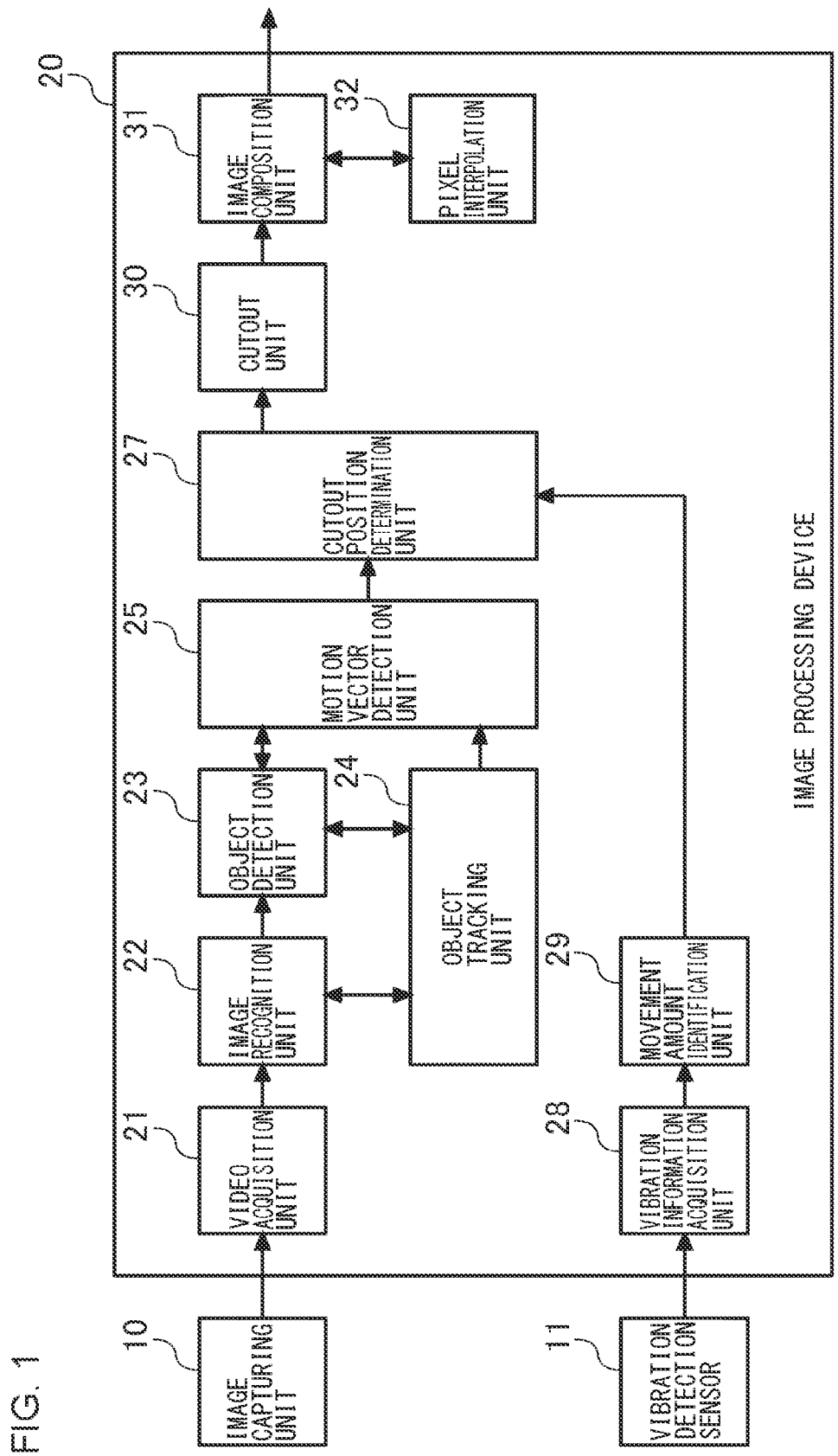
FIG. 1 is a diagram showing the configuration of an image capturing device according to the first embodiment of the present invention.

FIG. 1 is a diagram showing the configuration of an image capturing device 1 according to the first embodiment of the present invention. The image capturing device 1 may be a stand-alone video camera or a camera module installed in an information device such as a smartphone, a tablet, or a laptop computer.

The image capturing device 1 according to the first embodiment includes an image capturing unit 10, a vibration detection sensor 11, and an image processing device 20. The image capturing unit 10 includes a lens, a solid-state image sensor, and a signal processing circuit. For the solid-state image sensor, a complementary metal oxide semiconductor (CMOS) image sensor or a charge coupled device (CCD) image sensor can be used, for example. The solid-state image sensor converts light incident through the lens into an electrical video signal and outputs the signal to the signal processing circuit. The signal processing circuit performs signal processing such as A/D conversion, noise removal, and the like on the video signal input from the solid-state image sensor and outputs the resulting video signal to the image processing device 20.

The vibration detection sensor 11 detects vibration applied to the image capturing unit 10 and outputs the result to the image processing device 20. For example, a gyro sensor can be used for the vibration detection sensor 11. The gyro sensor detects vibrations applied to the image capturing unit 10 in the yaw direction and in the pitch direction each as angular velocity.

The image processing device 20 includes a video acquisition unit 21, an image recognition unit 22, an object detection unit 23, an object tracking unit 24, a motion vector detection unit 25, a cutout position determination unit 27, a vibration information acquisition unit 28, a movement amount identification unit 29, a cutout unit 30, an image composition unit 31, and a pixel interpolation unit 32. These components can be realized by the cooperation of hardware resources and software resources or only by hardware resources. As the hardware resources, CPU, ROM, RAM, graphics processing unit (GPU), digital signal processor (DSP), image signal processor (ISP), application specific integrated circuit (ASIC), field-programmable gate array (FPGA), and other LSIs can be used. As the software resources, firmware and other programs can be used.

The video acquisition unit 21 acquires video captured by the image capturing unit 10. The vibration information acquisition unit 28 acquires an output signal from the vibration detection sensor 11 as vibration component information. The movement amount identification unit 29 integrates the output signal acquired by the vibration information acquisition unit 28 so as to identify the movement amount of the image capturing unit 10. For example, the movement amount identification unit 29 integrates angular velocity signals in the yaw direction and the pitch direction acquired by the vibration information acquisition unit 28, respectively, so as to calculate the respective angles of movement of the image capturing unit 10 in the yaw direction and the pitch direction.

If the movement amount identification unit 29 detects from the difference between frames that the entire background area, excluding an object recognized by the image recognition unit 22 described below, is evenly moving in the same direction, the movement amount of the entire background area may be identified as the movement amount of the image capturing unit 10. In this case, even if the vibration detection sensor 11 is omitted, the movement amount of the image capturing unit 10 based on the vibration applied to the image capturing unit 10 can be estimated. The omission of the vibration detection sensor 11 allows the cost to be reduced.

The movement amount identification unit 29 generates a correction vector for cancelling out the identified movement amount of the image capturing unit 10. That is, the movement amount identification unit 29 generates a correction vector having the same amount of correction as the amount of movement of the image capturing unit 10 in the direction of the shaking of the image capturing unit 10. The movement amount identification unit 29 outputs the generated correction vector to the cutout position determination unit 27. When the image capturing unit 10 is ideally stationary, the value of the correction vector is zero.

The image recognition unit 22 searches for an object from within a frame of the video acquired by the video acquisition unit 21. The image recognition unit 22 has, as dictionary data, an identifier for a specific object generated by learning a large number of images in which a specific object are shown. Specific objects are, for example, the face of a person, the whole body of a person, the face of an animal (e.g., a dog or cat), the whole body of an animal, a vehicle (e.g., a railroad vehicle), etc.

The image recognition unit 22 searches within the frame of the video using the identifier for each object. For example, histograms of oriented gradients (HOG) feature values can be used for the recognition of an object. Haar-like feature values, local binary patterns (LBP) feature values, or the like may also be used. When an object exists within the frame, the image recognition unit 22 captures the object with a rectangular detection frame.

The object detection unit 23 determines whether or not to detect an object recognized by the image recognition unit 22 as an object of interest. The object of interest is the object that is presumed to be a subject that the user (photographer) of the image capturing device 1 is paying attention to.

The object detection unit 23 determines whether or not the recognized object serves as the subject based on any one or a combination of the criteria as follows:
   (a) Whether the object is larger than a predetermined size, (b) whether the object is located in the central area of the frame, (c) whether the object is a person or animal, (d) whether the distance to the object is less than a predetermined value (the method for estimating the distance to the object is described below), (e) whether there is no part of the object that is hidden, and (f) whether the motion of the object is smaller than a predetermined value (the method for detecting the motion is described below).

If multiple objects are recognized in a frame, the object detection unit 23 may detect all objects that satisfy the above criteria as subjects or may select one subject based on any one or a combination of the criteria as follows:
   (a)' whether the object is the largest object in the frame, (b)' whether the object is most centrally located in the frame, (d)' whether the distance to the object is the shortest, (f)' whether the object has the smallest motion among the moving objects.

These judgment criteria are based on the empirical rule that most of the subjects that the photographer is paying attention to occupies a large area in the frame, is located in the center of the frame, is located on the near side of the depth of field, and has a small motion in the frame due to the photographer following the subject with the image capturing device 1.

If a viewfinder screen of the image capturing device 1 is of a touch panel type, the object detection unit 23 may determine an object touched by the user of the image capturing device 1 to be the subject from among objects shown on the viewfinder screen.

The object tracking unit 24 tracks an object recognized by the image recognition unit 22 in the subsequent frame. For example, a particle filter or the mean shift method may be used to track the object. Objects to be tracked may be all the objects recognized by the image recognition unit 22 or only those detected as objects of interest by the object detection unit 23. If the motion of an object is used as the selection criterion for the subject, all the objects recognized by the image recognition unit 22 need to be tracked.

The motion vector detection unit 25 detects the amount of movement of an object of interest between frames of video as the motion vector of the object. This motion vector indicates the forward vector (tracking vector) of the motion of the object.

The cutout position determination unit 27 determines the cutout position for cutting out an image of a predetermined size from each frame of the video. The cutout position determination unit 27 cuts out a partial area from the entire image-capturing range captured by all pixels of the solid-state image sensor and determines the range of an image to be displayed or recorded.

In the present embodiment, an electronic image stabilization feature is employed. The electronic image stabilization feature adaptively changes the position of the angle of view to be cut out from the entire image-capturing range so as to cancel out the camera shake of the image capturing device 1. In the present embodiment, a subject tracking feature is also employed. The subject tracking feature changes the position of the angle of view to be cut out from the entire image-capturing range such that the position of the subject within the angle of view is fixed as much as possible relative to the motion of the subject. As described, in the present embodiment, real-time angle-of-view cutout is performed by the electronic image stabilization feature and the subject tracking feature.

The cutout position determination unit 27 acquires a correction vector from the movement amount identification unit 29 and acquires the position of the object of interest and a motion vector from the motion vector detection unit 25. The cutout position determination unit 27 separately determines the cutout position of the object of interest and the cutout position of the background.

The cutout position determination unit 27 determines an object cutout position in the current frame by moving an object cutout position in the reference frame in accordance with a composite vector in which the correction vector and the motion vector of the object are combined.

If the reference frame is the previous frame, the correction vector is a correction vector for cancelling out the motion of the image capturing unit 10 between the previous frame and the current frame, and the motion vector of the object is a motion vector indicating the motion of the object between the previous frame and the current frame. If the reference frame is a frame at the start of the tracking of the object, the correction vector is a correction vector for cancelling out the motion of the image capturing unit 10 between the frame at the start of the tracking and the current frame, and the motion vector of the object is a motion vector indicating the motion of the object between the frame at the start of the tracking and the current frame.

The cutout position determination unit 27 moves a background cutout position of the reference frame in accordance with the correction vector so as to determine the background cutout position of the current frame. If the reference frame is the previous frame, the correction vector is a correction vector for cancelling out the motion of the image capturing unit 10 between the previous frame and the current frame. If the reference frame is the frame at the start of the tracking of the object, the correction vector is a correction vector for cancelling out the motion of the image capturing unit 10 between the frame at the start of the tracking and the current frame.

The cutout position determination unit 27 may determine the background cutout position by moving the object cutout position in the current frame in accordance with the inverse vector of the motion vector of the object. In this case, the motion vector of the object is a motion vector indicating the motion between the frame at the start of the tracking and the current frame.

The cutout unit 30 cuts out only image data of the object from image data of the object cutout position. The cutout unit 30 cuts out image data of the background excluding the object from image data of the background cutout position. The image composition unit 31 combines the cut-out image data of the object and the cut-out image data of the background.

As will be explained in detail below, when multiple objects of interest are set in a frame, defective pixels may occur in the combined image. In such a case, the pixel interpolation unit 32 interpolates for the defective pixels in the combined image based on at least one effective pixel spatially or temporally proximate to the defective pixels.

Figure 2A:
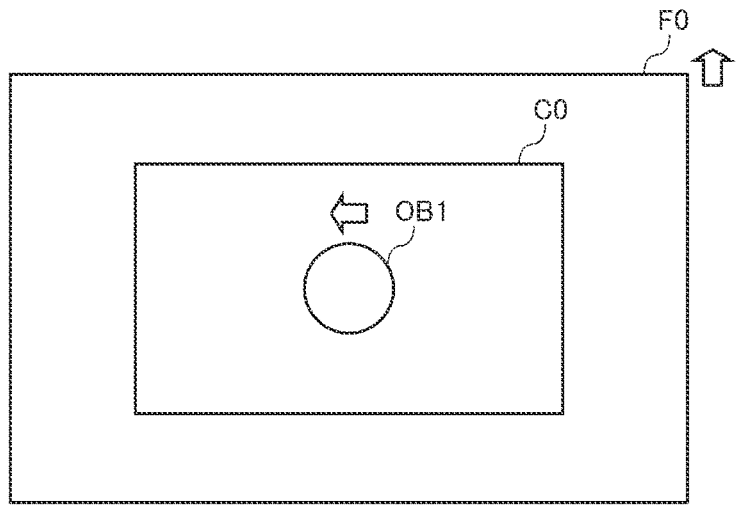
FIGS. 2A to 2C are diagrams for explaining specific examples of composite image generation processing performed by an image processing device according to the first embodiment (Part 1)
Figure 2B:
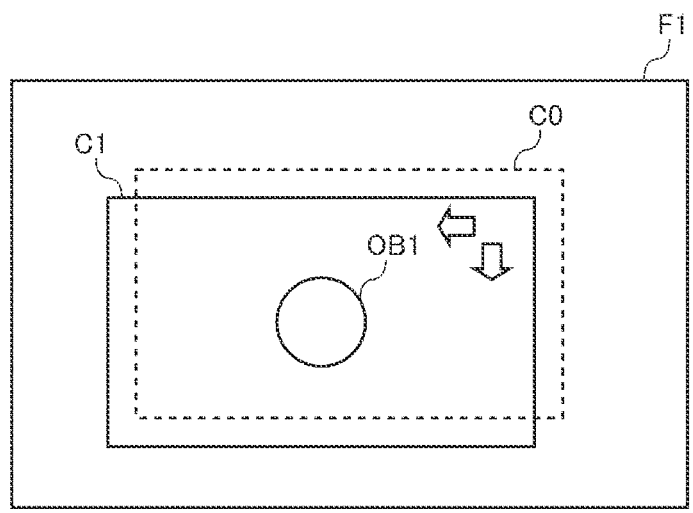
Figure 2C:
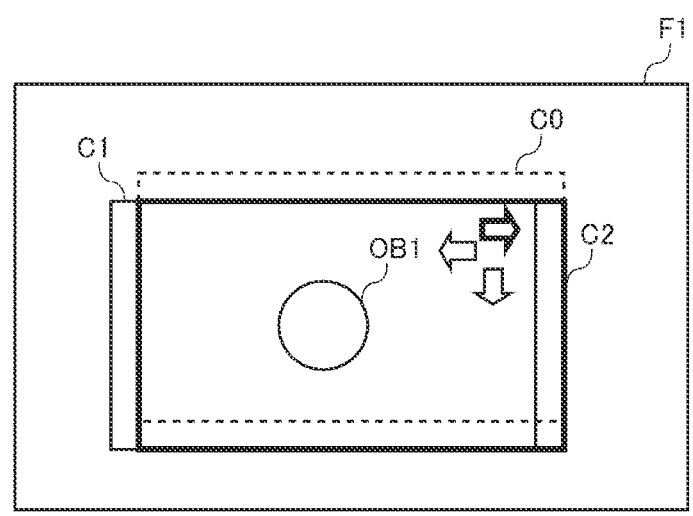
Figure 3A:
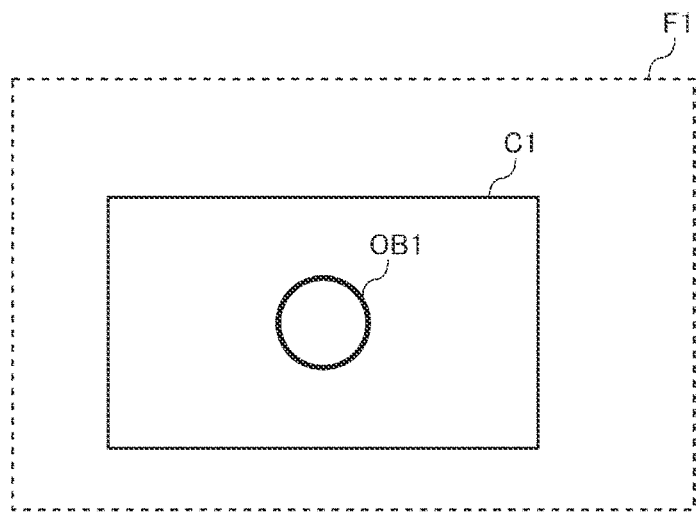
FIGS. 3A to 3C are diagrams for explaining specific examples of the composite image generation processing performed by the image processing device according to the first embodiment (Part 2)
Figure 3B:
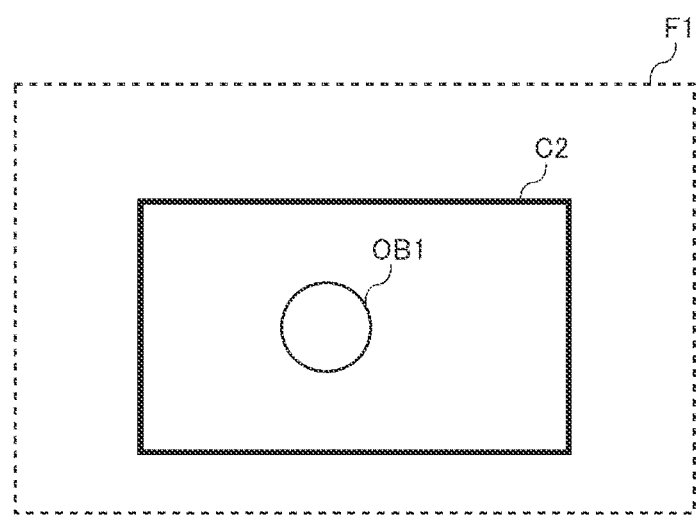
Figure 3C:
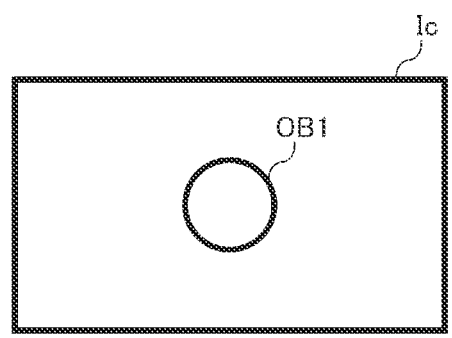

FIGS. 2A to 2C are diagrams for explaining specific examples of composite image generation processing performed by the image processing device 20 according to the first embodiment (Part 1). FIGS. 3A to 3C are diagrams for explaining specific examples of composite image generation processing performed by the image processing device 20 according to the first embodiment (Part 2).

As shown in FIG. 2A, the cutout position determination unit 27 sets a cutout position C0 at the center of a frame F0 by default. The object detection unit 23 detects an object OB1 in the frame F0 as an object of interest. The object tracking unit 24 starts tracking the object OB1. In the example shown in FIG. 2A, the object OB1 is moving to the left. Further, the image capturing unit 10 is moving upward due to camera shake by the photographer.

As shown in FIG. 2B, the cutout position determination unit 27 moves the cutout position C0 of the reference frame F0 according to the composite vector of the correction vector for camera shake and the motion vector of the object OB1 and determines a cutout position C1 for the object OB1 in the current frame F1.

As shown in FIG. 2C, the cutout position determination unit 27 moves the cutout position C1 for the object OB1 in the current frame F1 according to the inverse vector of the motion vector of the object OB1 and determines a cutout position C2 for the background.

As shown in FIG. 3A, the cutout unit 30 cuts out image data of the object OB1 from image data of the cutout position C1 for the object OB1 in the current frame F1. As shown in FIG. 3B, the cutout unit 30 cuts out image data of the background excluding the image data of the object OB1 from image data of the cutout position C2 for the background of the current frame F1. As shown in FIG. 3C, the image composition unit 31 combines the cut-out image data of the object OB1 and the cut-out image data of the background so as to generate a new composite image Ic.

As explained above, according to the first embodiment, when tracking a subject from the entire image-capturing range and cutting out the angle of view, the angle of view for the subject and the angle of view for the background are cut out separately, and background blur correction is performed for the angle of view for the background. Background blur can be suppressed by combining the field angle for the subject and the field angle for the background after the background blur correction. At this time, camera shake correction is performed for both the field angle for the subject and the field angle for the background. This allows for the generation of video in which blurring is suppressed over the entire angle of view.

Therefore, it is possible to generate video with a natural background while clearly capturing the subject. For example, when capturing an image of a cat in a living room, the cat is tracked by the subject tracking feature, and blurring of the cat is thus suppressed. Furthermore, the background does not move rapidly in response to the cat's movements, and video with a natural background can be captured. Also, when the photographer is panning, the background movement is suppressed, and it is thus possible to suppress the generation of video in which it is difficult to recognize what is shown. Also, as will be described in detail below, even when there are multiple subjects, the multiple subjects can be captured in a single angle of view as much as possible. Further, by applying the same strength of the correction vector for cancelling out camera shake as the strength of the motion vector of the subject, it is possible to capture video with a still background such as a virtual background. It is also possible to create materials that can be used for a virtual background.

Figure 4:
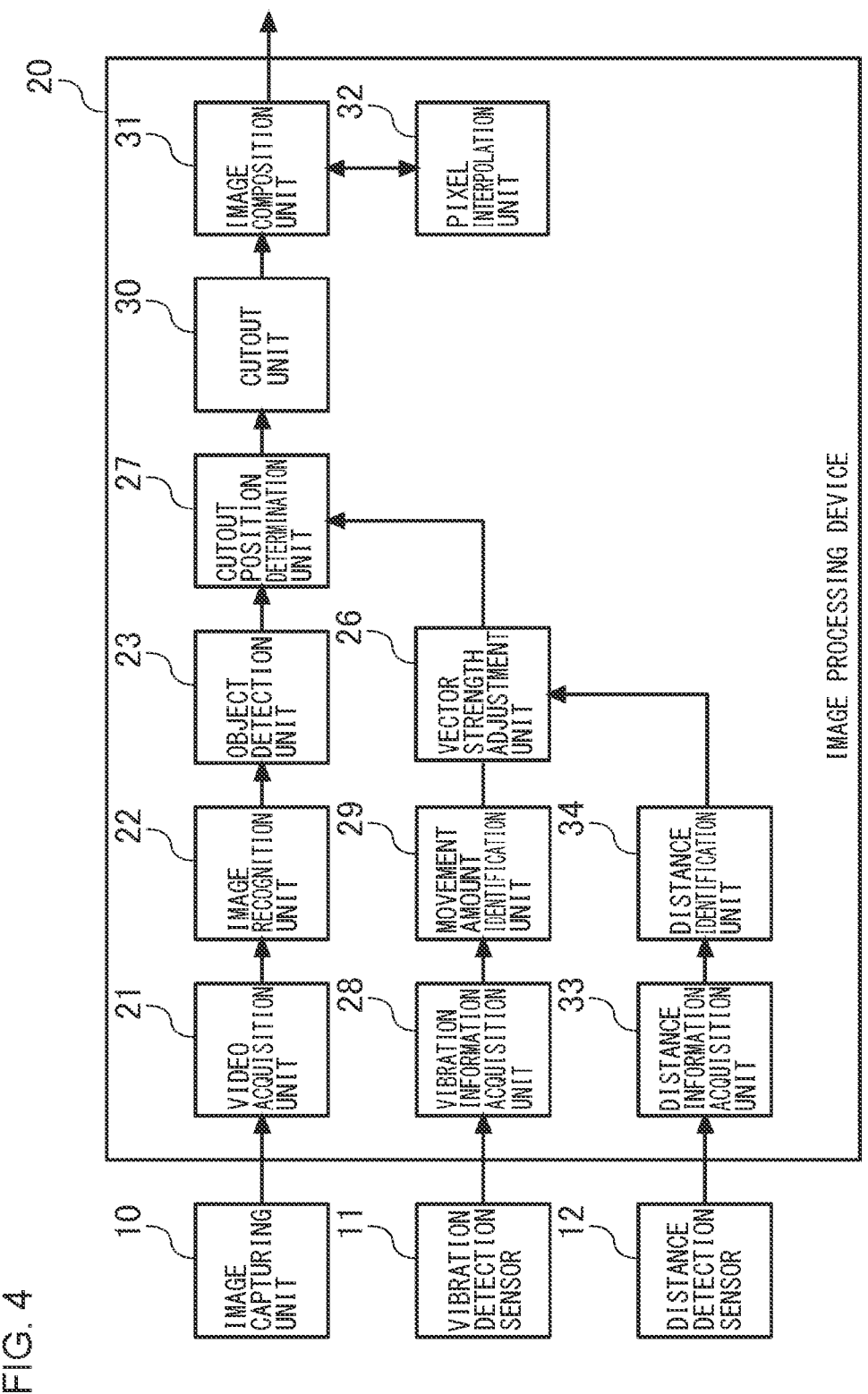
FIG. 4 is a diagram showing the configuration of an image capturing device according to the second embodiment of the present invention.

FIG. 4 is a diagram showing the configuration of an image capturing device 1 according to the second embodiment of the present invention. The image capturing device 1 according to the second embodiment includes an image capturing unit 10, a vibration detection sensor 11, a distance detection sensor 12, and an image processing device 20. The image processing device 20 according to the second embodiment includes a video acquisition unit 21, an image recognition unit 22, an object detection unit 23, a vector strength adjustment unit 26, a cutout position determination unit 27, a vibration information acquisition unit 28, a movement amount identification unit 29, a cutout unit 30, an image composition unit 31, a pixel interpolation unit 32, a distance information acquisition unit 33, and a distance identification unit 34.

In the following, an explanation will be given regarding the differences from the first embodiment. The distance detection sensor 12 is a sensor for detecting the distance of an object in the image-capturing direction from the image capturing unit 10. For example, a Time of Flight (TOF) sensor can be used for the distance detection sensor 12. Typical TOF sensors include ultrasonic sensors (sonar) and light detection and ranging (LiDAR). Ultrasonic sensors emit ultrasonic waves in the image-capturing direction and measure the time it takes to receive the reflected waves so as to detect the distance to an object in the image-capturing direction. LiDAR emit laser light in the image-capturing direction and measure the time it takes to receive the reflected light so as to detect the distance to an object in the image-capturing direction.

The distance information acquisition unit 33 acquires an output signal from the distance detection sensor 12 as distance information. The distance identification unit 34 generates a distance image corresponding to a visible light image captured by the image capturing unit 10 based on the acquired distance information.

The distance identification unit 34 may estimate the distance from the image capturing unit 10 to the object captured in the frame through image recognition. For example, the relationship among the general size of an object registered as dictionary data, the size of the object captured in a frame, and the distance from the image capturing unit 10 to the object is defined in advance by a table or a function. Based on the size of the object recognized by the image recognition unit 22 in the frame, the distance identification unit 34 estimates the distance from the image capturing unit 10 to the object with reference to the table or the function. In this case, even if the distance detection sensor 12 is omitted, the distance to the object shown in the frame can still be estimated. The omission of the distance detection sensor 12 can reduce the cost.

If the distance identification unit 34 can acquire the distance from the image capturing unit 10 to the object shown in the frame from an auto-focus adjustment unit (not shown), the distance identification unit 34 may use the distance acquired from the auto-focus adjustment unit. If the image capturing unit 10 is configured with twin lenses, the distance identification unit 34 may estimate the distance to the object shown in the frame based on parallax between video pictures captured by the twin-lens image capturing unit 10.

The subject tracking feature is omitted in the second embodiment. Therefore, basically, there is no need to calculate the motion vector of an object, and the object tracking unit 24 and the motion vector detection unit 25 are omitted from the image processing device 20 in the second embodiment.

An electronic image stabilization feature is also employed in the second embodiment. In other words, the position of the angle of view to be cut out from the entire image-capturing range is adaptively moved such that the camera shake of the image capturing device 1 is canceled out. In the second embodiment, a vector strength adjustment unit 26 for adjusting the strength of a correction vector for cancelling out camera shake is added.

The vector strength adjustment unit 26 acquires a correction vector from the movement amount identification unit 29 and the distance to the object from the distance identification unit 34. The vector strength adjustment unit 26 adjusts the strength of a correction vector acquired from the movement amount identification unit 29 according to the distance to the object acquired from the distance identification unit 34. The vector strength adjustment unit 26 sets the strength of the correction vector to be stronger as the distance to the object is shorter and sets the strength of the correction vector to be weaker as the distance to the object is longer.

For example, the relationship among the amount of camera shake, the distance from the image capturing unit 10 to the object, and the amount of movement of the object shown in the frame caused due to camera shake is defined in advance by a table or a function. The relationship may be derived based on experiments or simulations by the designer. The vector strength adjustment unit 26 adjusts the strength of the correction vector acquired from the movement amount identification unit 29 based on the distance from the image capturing unit 10 to the object acquired from the distance identification unit 34 with reference to the table or the function.

In the second embodiment, the cutout position determination unit 27 acquires the position of the object of interest from the object detection unit 23 and acquires the correction vector of the object from the vector strength adjustment unit 26. The cutout position determination unit 27 moves the cutout position of a reference frame (for example, the previous frame) in accordance with the correction vector so as to determine the cutout position of the current frame. At that time, the cutout position determination unit 27 determines the object cutout position and the background cutout position separately in accordance with the strength of the correction vector of the object and the strength of the correction vector of the background.

If multiple objects of interest are set in a frame, the cutout position determination unit 27 determines a cutout position for each object of interest. For example, when a first object and a second object located behind the first object are detected as objects of interest in a frame, the vector strength adjustment unit 26 sets the strength of a correction vector for the first object to be stronger than that for the second object.

The correction vector for the background may be used directly without adjusting the strength of the correction vector, or the vector strength adjustment unit 26 may adjust the strength of the correction vector. For example, the entire background may be divided into multiple backgrounds according to distance divisions, and the vector strength adjustment unit 26 may adjust the strength of the correction vector for each divided background. The vector strength adjustment unit 26 may also adjust the strength of the correction vector based on a representative value (e.g., mean, median, or mode) of the distance to each object constituting the background.

Figure 5A:
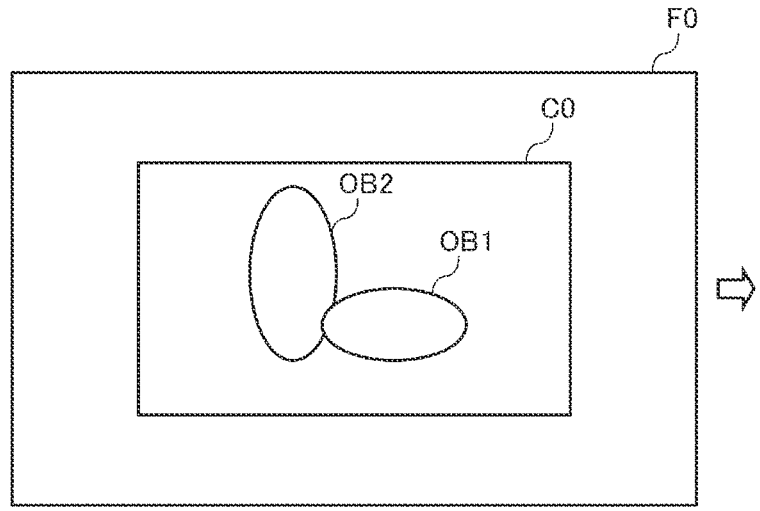
FIGS. 5A to 5C are diagrams for explaining specific examples of composite image generation processing performed by the image processing device according to the second embodiment (Part 1)
Figure 5B:
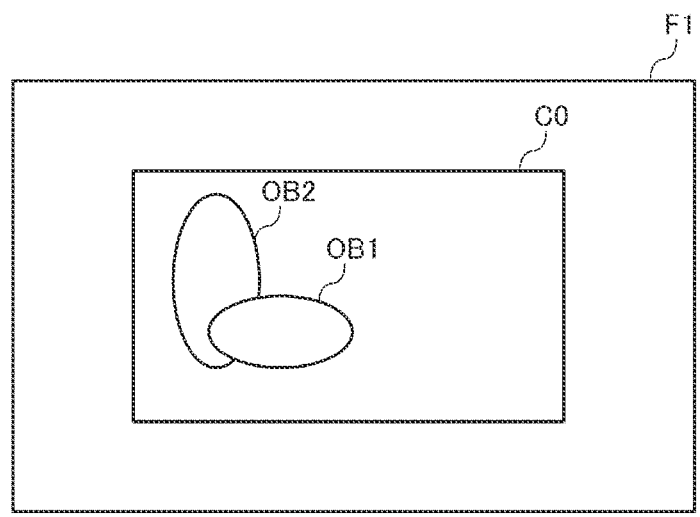
Figure 5C:
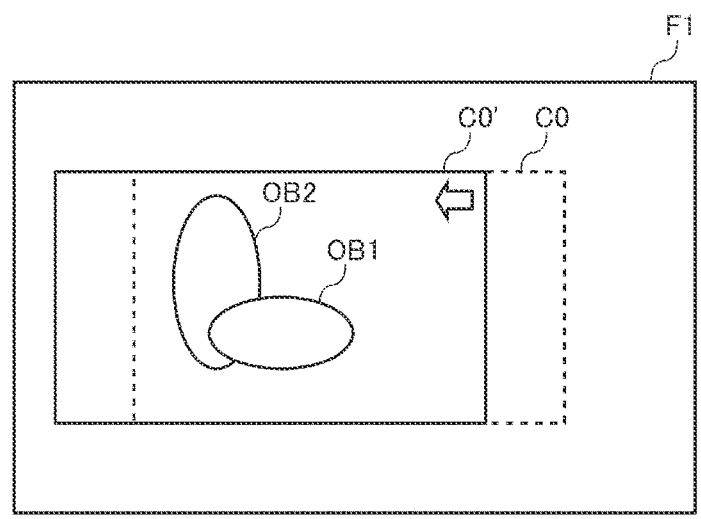
Figure 6A:
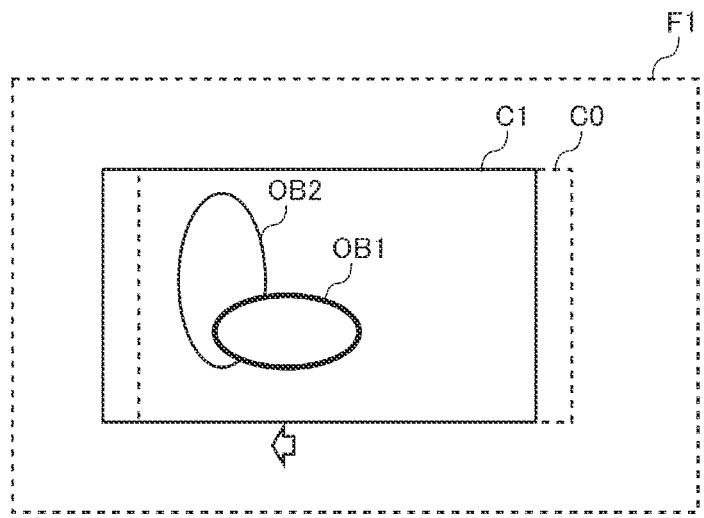
FIGS. 6A to 6C are diagrams for explaining specific examples of the composite image generation processing performed by the image processing device according to the second embodiment (Part 2)
Figure 6B:
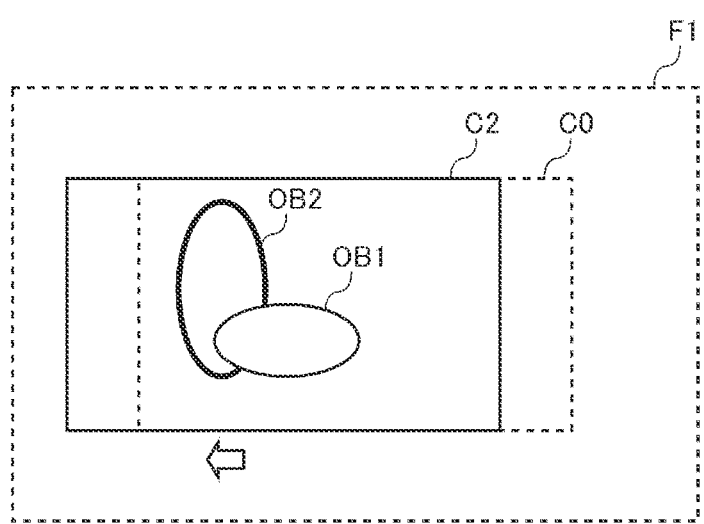
Figure 6C:
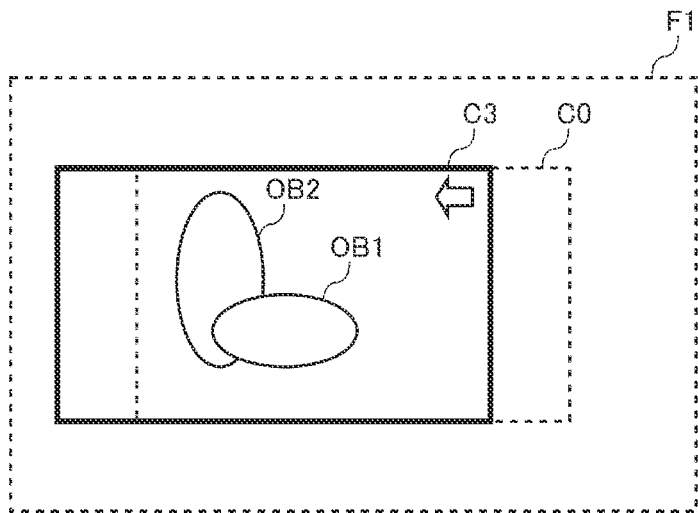
Figure 7A:
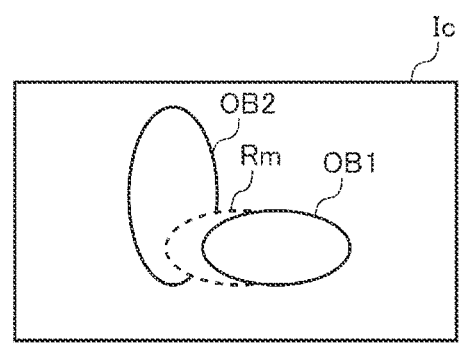
FIGS. 7A and 7B are diagrams for explaining specific examples of the composite image generation processing performed by the image processing device according to the second embodiment (Part 3)
Figure 7B:
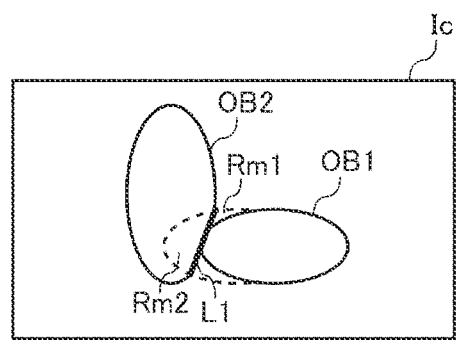

FIGS. 5A to 5C are diagrams for explaining specific examples of composite image generation processing performed by the image processing device 20 according to the second embodiment (Part 1). FIGS. 6A to 6C are diagrams for explaining specific examples of composite image generation processing performed by the image processing device 20 according to the second embodiment (Part 2). FIGS. 7A and 7B are diagrams for explaining specific examples of composite image generation processing performed by the image processing device 20 according to the second embodiment (Part 3).

As shown in FIG. 5A, the cutout position determination unit 27 sets the cutout position C0 at the center of the frame F0 by default. The object detection unit 23 detects the first object OB1 and the second object OB2 as objects of interest in the frame F0. The second object OB2 exists behind the first object OB1 when viewed from the image capturing unit 10, and part of the second object OB2 is hidden behind the first object OB1 in the frame F0.

FIG. 5B shows a state in which the image capturing unit 10 has moved to the right from the state shown in FIG. 5A due to camera shake by the photographer. FIG. 5B shows a case where the electronic image stabilization feature is off. In this case, the first object OB1 and the second object OB2 move to the left side of the angle of view without changing the cutout position C0.

At that time, the viewpoint moves to the right due to the movement of the image capturing unit 10 to the right, which changes the appearance of the relative positional relationship between the first object OB1 and the second object OB2. More specifically, in the current frame F1, the first object OB1 located closer to the viewpoint moves farther left than the second object OB2 located farther away from the viewpoint. That is, in the current frame F1, the overlap of the first object OB1 and the second object OB2 is larger, and a portion where the second object OB2 is hidden by the first object OB1 is larger, compared with the reference frame F0 before camera shake.

FIG. 5C shows a case where the electronic camera shake correction feature is on and the cutout position C0 of the reference frame F0 has simply been moved to the left according to a camera shake correction vector. By moving the cutout position C0, the first object OB1 and the second object OB2 are arranged at the center of the angle of view at a cutout position C0' of the current frame F1. However, the compositional arrangement of the first object OB1 and the second object OB2 in the current frame F1 has changed compared to the reference frame F0.

On the other hand, in FIGS. 6A-6C, the respective cutout positions of the first object OB1, the second object OB2, and the background are determined separately. As shown in FIG. 6A, the cutout position determination unit 27 moves the cutout position C0 of the reference frame F0 according to the correction vector of the first object OB1 and determines the cutout position C1 for the first object OB1. As shown in FIG. 6B, the cutout position determination unit 27 moves the cutout position C0 of the reference frame F0 according to the correction vector of the second object OB2 and determines the cutout position C2 for the second object OB2. As shown in FIG. 6C, the cutout position determination unit 27 moves the cutout position C0 of the reference frame F0 according to the correction vector of the background and determines the cutout position C3 for the background.

As shown in FIG. 7A, the cutout unit 30 cuts out the image data of the first object OB1 from the image data of the cutout position C1 for the first object OB1, cuts out the image data of the second object OB2 from the image data of the cutout position C2 for the second object OB2, and cuts out the image data of the background excluding the first object OB1 and the second object OB2 from the image data of the cutout position C3 for the background. The image composition unit 31 combines the cut-out image data of the first object OB1, the cut-out image data of the second object OB2, and the cut-out image data of the background so as to generate a new composite image Ic.

The compositional arrangement of the first object OB1 and the second object OB2 in the newly-generated composite image Ic is the same as the compositional arrangement of the first object OB1 and the second object OB2 in the cutout position C0 of the reference frame F0. That is, it is possible to perform pseudo viewpoint conversion as if the image capturing unit 10 were not moving.

The overlap of the first object OB1 and the second object OB2 in the composite image Ic newly generated from the current frame F1 is smaller than the overlap of the first object OB1 and the second object OB2 actually shown in the current frame F1. Therefore, in the newly-generated composite image Ic, missing of pixels occurs in the area of the difference between the overlapping portions of the two. That is, the partial area hidden by the first object OB1 becomes a defective pixel area Rm.

The pixel interpolation unit 32 interpolates pixels in this defective pixel area Rm based on at least one effective pixel spatially or temporally close to the defective pixel area Rm. As the first interpolation method, the pixel interpolation unit 32 generates complementary pixels from peripheral pixels adjacent to the defective pixel area Rm in the current frame F1.

For example, the pixel interpolation unit 32 assigns each pixel in the defective pixel area Rm the same pixel as the effective pixel closest to the pixel. For example, the pixel interpolation unit 32 may assign a representative value of multiple effective pixels adjacent to the defective pixel area Rm to a pixel in the defective pixel area Rm. For each pixel in the defective pixel area Rm, multiple effective pixels in close proximity may be identified, and a representative value of the multiple identified effective pixels may be calculated.

For example, from effective pixels adjacent to the left, right, upper, and lower sides of the defective pixel area Rm, the pixel interpolation unit 32 may interpolate multiple pixels in the defective pixel area Rm in between. For example, linear interpolation may be performed line by line. At that time, multiple pixels in the defective pixel area Rm may be interpolated with gradation. When applying gradation, the color differences among multiple pixels may be uniform, or the color difference between pixels may be changed according to a certain rule (for example, an exponential change).

As the second interpolation method, the pixel interpolation unit 32 searches for a frame in which effective pixels exist in an area corresponding to the defective pixel area Rm of the current frame F1 (hereinafter, simply referred to as "corresponding area") from among multiple frames that are temporally close to the current frame F1 and interpolates pixels in the defective pixel area Rm of the current frame F1 based on effective pixels in the corresponding area in the frame that has been searched for.

For example, in the defective pixel area Rm of the current frame F1, the pixel interpolation unit 32 interpolates effective pixels in a corresponding area in the frame most temporally adjacent to the current frame F1 among the frames in which effective pixels exist in the respective corresponding areas. For example, from among the frames in which effective pixels exist in the respective corresponding areas, the pixel interpolation unit 32 identifies a frame whose representative value of effective pixels in a corresponding area is closest to the representative value of the pixels in the area of the second object OB2 having a defective portion in the current frame F1. In the defective pixel area Rm of the current frame F1, the pixel interpolation unit 32 interpolates the effective pixels in the corresponding area in the identified frame.

As the third interpolation method, the pixel interpolation unit 32 estimates the original shape of the second object OB2 having a defective portion in the current frame F1, divides the defective pixel area Rm into the area of the second object OB2 and the area of the background, and interpolates pixels in each area.

In the example shown in FIG. 7B, the pixel interpolation unit 32 draws a straight line L1 between two points where the outer circumference of the second object OB2 and the defective pixel area Rm intersect. The pixel interpolation unit 32 estimates a left side area Rm2 of the straight line L1 in the defective pixel area Rm as the area of the second object OB2 and a right side area Rm1 of the straight line L1 as the area of the background.

The pixel interpolation unit 32 interpolates pixels in the left side area Rm2 of the defective pixel area Rm based on the effective pixels of the second object OB2. At that time, the first interpolation method can be used while setting the reference range to be within the range of the effective pixels of the second object OB2. The pixel interpolation unit 32 interpolates pixels in the right side area Rm1 of the defective pixel area Rm based on the effective pixels of the background close to the right side area Rm1. At that time, the first interpolation method can be used while setting the reference range to be within the range of the effective pixels of the background.

As explained above, according to the second embodiment, camera shake correction is performed separately on the subject and the background in the same frame. At that time, by changing the correction strength for the subject and the correction strength for the background according to the distance from the image capturing unit 10, the camera shake can be corrected while maintaining the compositional arrangement in the frame. Further, if an area where pixels are missing occurs due to the movement of the cutout position, the unnaturalness of the image can be reduced by interpolating pixels that are spatially or temporally close. As a result of the above, it is possible to generate video as if the image capturing device 1 were stationary despite the occurrence of camera shake.

Figure 8:
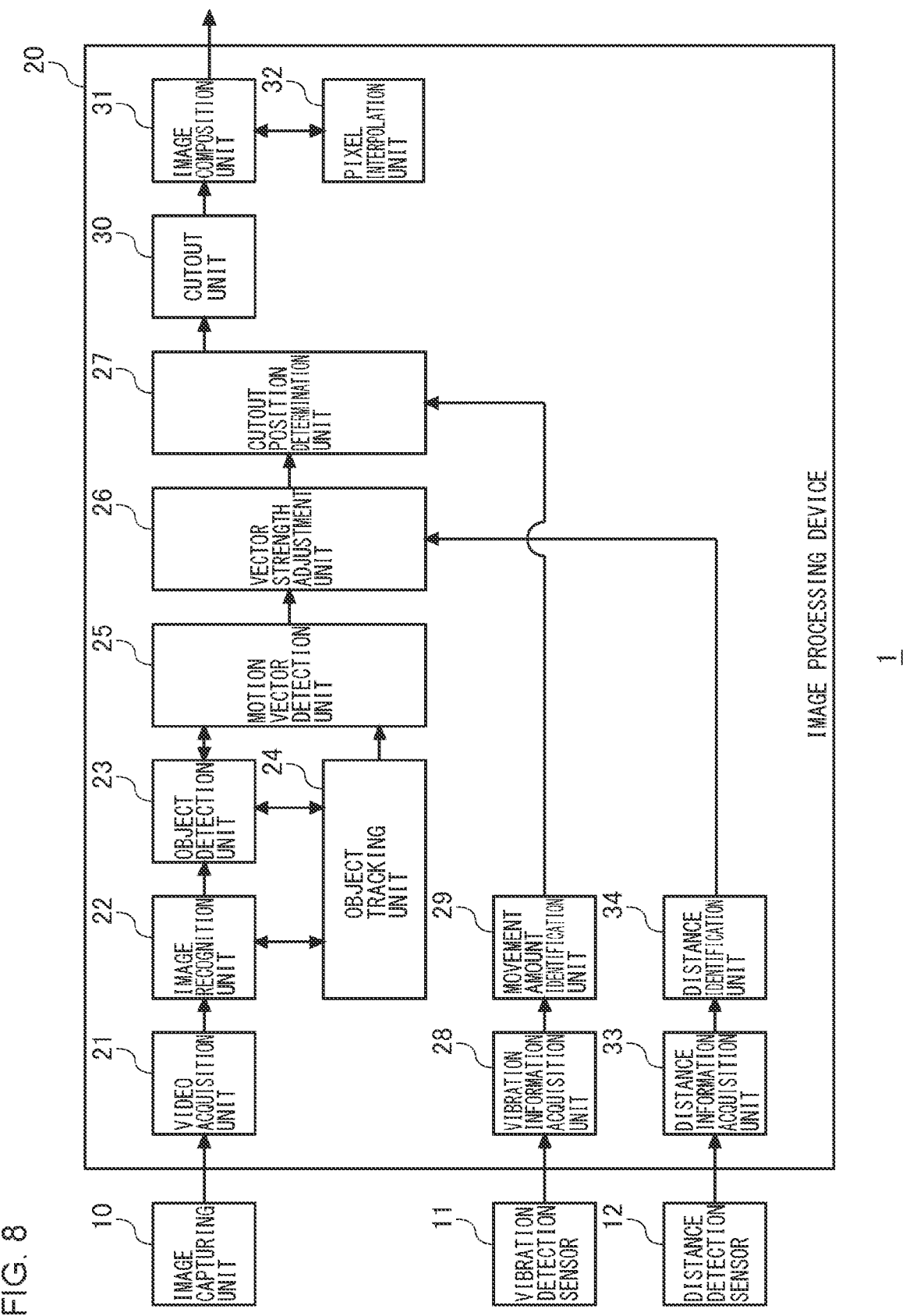
FIG. 8 is a diagram showing the configuration of an image capturing device according to the third embodiment of the present invention.

FIG. 8 is a diagram showing the configuration of an image capturing device 1 according to the third embodiment of the present invention. The image capturing device 1 according to the third embodiment includes an image capturing unit 10, a vibration detection sensor 11, a distance detection sensor 12, and an image processing device 20. The image processing device 20 according to the third embodiment includes a video acquisition unit 21, an image recognition unit 22, an object detection unit 23, an object tracking unit 24, a motion vector detection unit 25, a vector strength adjustment unit 26, a cutout position determination unit 27, a vibration information acquisition unit 28, a movement amount identification unit 29, a cutout unit 30, an image composition unit 31, a pixel interpolation unit 32, a distance information acquisition unit 33, and a distance identification unit 34.

In the following, an explanation will be given regarding the differences from the first and second embodiments. As in the first embodiment, both a subject tracking feature and an electronic image stabilization feature are employed in the third embodiment. In the third embodiment, the vector strength adjustment unit 26 acquires the motion vector of an object of interest from the motion vector detection unit 25 and acquires the distance to the object from the distance identification unit 34. The vector strength adjustment unit 26 adjusts the strength of the motion vector of the object of interest acquired from the motion vector detection unit 25 according to the distance to the object acquired from the distance identification unit 34. The vector strength adjustment unit 26 sets the strength of the motion vector of the object to be stronger as the distance to the object is shorter and sets the strength of the motion vector of the object to be weaker as the distance to the object is longer.

For example, the relationship among the amount of movement caused due to the actual motion of the object, the distance from the image capturing unit 10 to the object, and the amount of movement of the object in the frame relative to the actual motion of the object is defined in advance by a table or a function. The relationship may be derived based on experiments or simulations by the designer. The vector strength adjustment unit 26 adjusts the strength of the motion vector of the object acquired from the motion vector detection unit 25 based on the distance from the image capturing unit 10 to the object acquired from the distance identification unit 34 with reference to the table or the function.

In the third embodiment, the cutout position determination unit 27 moves the cutout position of a reference frame according to a composite vector of a correction vector for camera shake and a motion vector of an object adjusted by the vector strength adjustment unit 26 so as to determine the object cutout position (see FIG. 2B). The following processing is the same as that in the first embodiment.

As described above, there are cases where multiple objects of interest are set in a frame. In such cases, multiple objects may be moving in different directions. In that case, the compositional arrangement in an image obtained by combining the respective angles of view for the objects may deviate greatly from the actual compositional arrangement. Therefore, the total cutout range before combining multiple cutout positions may be limited.

Figure 9A:
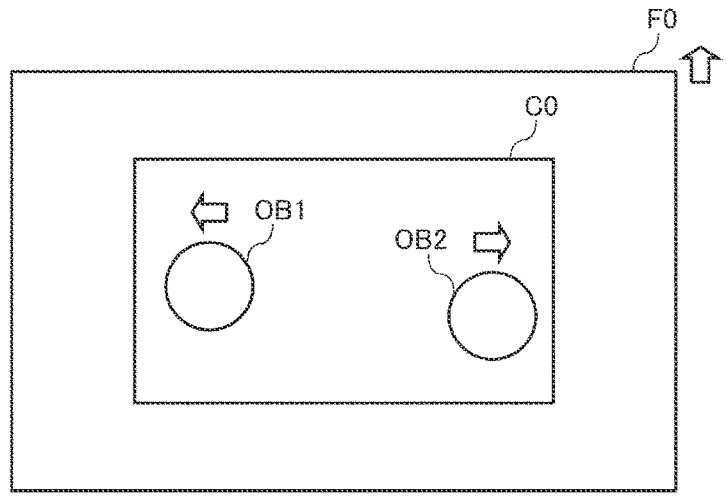
FIGS. 9A to 9C are diagrams for explaining specific examples of total cutout range limitation processing performed by the image processing device according to the first and third embodiments.
Figure 9B:
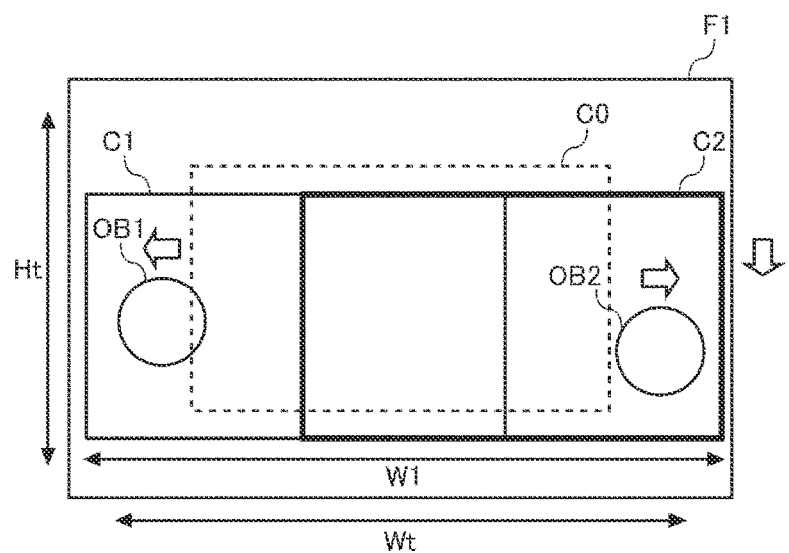
Figure 9C:
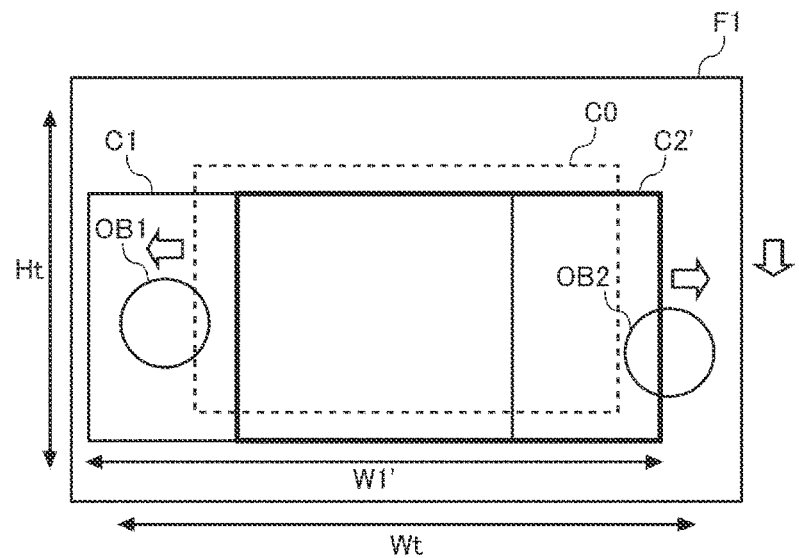

FIGS. 9A to 9C are diagrams for explaining specific examples of total cutout range limitation processing performed by the image processing device 20 according to the first and third embodiments. As shown in FIG. 9A, the cutout position determination unit 27 sets the cutout position C0 at the center of the frame F0 by default. The object detection unit 23 detects the first object OB1 and the second object OB2 as objects of interest in the frame F0. The object tracking unit 24 starts tracking the first object OB1 and the second object OB2. In an example shown in FIG. 9A, the first object OB1 is moving to the left and the second object OB2 is moving to the right. Further, the image capturing unit 10 is moving upward due to the camera shake of the photographer.

As shown in FIG. 9B, the cutout position determination unit 27 moves the cutout position C0 of the reference frame F0 according to the composite vector of the correction vector for camera shake and the motion vector of the first object OB1 and determines a cutout position C1 for the first object OB1 in the current frame F1. In the same manner, the cutout position determination unit 27 moves the cutout position C0 of the reference frame F0 according to the composite vector of the correction vector for camera shake and the motion vector of the second object OB2 and determines a cutout position C2 for the second object OB2 in the current frame F1.

In an example shown in FIG. 9B, the width W1 of the total cutout range before combining the cutout position C1 for the first object OB1 and the cutout position C2 for the second object OB2 is widened. When the image data of the first object OB1 in the cutout position C1, the image data of the second object OB2 in the cutout position C2, and background data in the background cutout position (not shown in FIG. 9B) are combined, both the first object OB1 and the second object OB2 are completely within the angle of view in the composite image. However, an image is generated in which the first object OB1 and the second object OB2 are closer than the actual distance regarding their positional relationship, and the deviation from the actual positional relationship increases.

Therefore, a limitation is set to the total cutout range. More specifically, an upper width limit Wt and an upper height limit Ht are set to the total cutout range. When multiple objects are detected in a frame, the vector strength adjustment unit 26 adjusts the strength of at least one of the motion vectors of the multiple objects such that the objects fit into the limited total cutout range.

In an example shown in FIG. 9C, the vector strength adjustment unit 26 weakens the strength of the motion vector of the second object OB2 to satisfy the upper width limit Wt of the total cutout range. More specifically, the vector strength adjustment unit 26 weakens the strength of the motion vector of the second object OB2 such that the width W1' of the total cutout range before combining the cutout position C1 for the first object OB1 and the cutout position C2' for the second object OB2 is equal to the upper width limit Wt of the total cutout range. In this case, a part of the second object OB2 is removed from the angle of view in the composite image.

The vector strength adjustment unit 26 may weaken the strength of the motion vector of the first object OB1 instead of the strength of the motion vector of the second object OB2 or may weaken the strength of both the motion vector of the first object OB1 and the motion vector of the second object OB2.

The object for which the strength of the motion vector is weakened may be a low priority object. The priority may be set higher as the size of an object becomes larger. The priority may be set higher as an object becomes closer to the center of the frame. The priority may be set higher as an object becomes closer from the image capturing unit 10. The priority may be set higher as the motion of an object becomes smaller. A combination of these criteria may also be used.

The setting of the values of the upper width limit Wt and the upper height limit Ht of the total cutout range may be changeable by the user. The larger the values of the upper width limit Wt and the upper height limit Ht are set, the higher the probability that all the objects will fit into the angle of view in the composite image. On the other hand, the smaller the values of the upper width limit Wt and the upper height limit Ht are set, the weaker the strength of the correction becomes, and the deviation from the actual compositional arrangement can thus be reduced.

As explained above, the third embodiment achieves the effects of both the first embodiment and the second embodiment. In other words, video with a natural compositional arrangement in the angle of view can be generated in which blurring is suppressed over the entire angle of view. The second embodiment can also be regarded as an example of a case where the subject is stationary in the third embodiment.

Described above is an explanation of the present invention based on the embodiments. These embodiment is intended to be illustrative only, and it will be obvious to those skilled in the art that various modifications to constituting elements and processes could be developed and that such modifications are also within the scope of the present invention.

FIGS. 9A-9C above explain an example in which multiple objects to be tracked are set in a frame. In this regard, one or more of the multiple objects recognized in a frame may be set as objects to be tracked, and the remaining objects may be set as the objects not to be tracked. In this case, the objects not to be tracked are processed as the background.

The first through third embodiments described above explain an example of generating a composite image by adjusting the angle of view for cutout in real time during image-capturing. In this regard, video data of the entire image-capturing range and sensor information at each frame time may be recorded, and after the end of image-capturing, the recorded video data of the entire image-capturing range and the sensor information at each frame time may be read out, and the composite image generation processing according to the above-mentioned first through third embodiments may be executed. In that case, the composite image generation processing may be performed in a separate image playback device (e.g., PC or smartphone) instead of being performed in the image capturing device 1.

What is claimed is:

1. An image processing device comprising:
  a video acquisition unit that acquires video captured by an image capturing unit;
  a movement amount identification unit that identifies an amount of movement of the image capturing unit that is based on vibration applied to the image capturing unit based on an output signal from a sensor for detecting vibration applied to the image capturing unit or a difference between frames of the acquired video;
  an object detection unit that detects an object of interest from within frames of the acquired video;
  a distance identification unit that identifies a distance from the image capturing unit to the object based on an output signal from a sensor for measuring a distance or a size of the object in a frame;
  a vector strength adjustment unit that adjusts a strength of a correction vector for cancelling out shake caused by the vibration;
  a cutout position determination unit that determines a cutout position for cutting out an image of a predetermined size from each of the frames of the acquired video and that moves the cutout position in accordance with the correction vector and separately determines an object cutout position and a background cutout position according to the strength of the correction vector; and an image composition unit that combines image data of the object cut out from the object cutout position with image data of a background cut out from the background cutout position excluding the object, wherein the vector strength adjustment unit sets a strength of the motion vector such that a smaller a distance to the object, a larger a strength of the correction vector.

2. The image processing device according to claim 1, wherein when a first object and a second object located behind the first object are detected in a frame, the vector strength adjustment unit sets the strength of the correction vector for moving a cutout position for the first object to be stronger than the strength of the correction vector for moving a cutout position for the second object.

3. The image processing device according to claim 2, further comprising:

a pixel interpolation unit that interpolates, when a defective pixel occurs in an image synthesized by the image composition unit, for the defective pixel based on at least one effective pixel spatially or temporally proximate to the defective pixel.

4. An image processing method comprising:

identifying an amount of movement of the image capturing unit that is based on vibration applied to the image capturing unit based on an output signal from a sensor for detecting vibration applied to the image capturing unit or a difference between frames of the acquired video;

detecting an object of interest from within frames of the acquired video;

identifying a distance from the image capturing unit to the object based on an output signal from a sensor for measuring a distance or the size of the object in a frame;

adjusting the strength of a correction vector for cancelling out shake caused by the vibration;

determining a cutout position for cutting out an image of a predetermined size from each of the frames of the acquired video and that moves the cutout position in accordance with the correction vector and separately determines an object cutout position and a background cutout position according to the strength of the correction vector;

combining image data of the object cut out from the object cutout position with image data of a background cut out from the background cutout position excluding the object, and setting the strength of the motion vector such that the smaller the distance to the object, the larger the strength of the correction vector.

5. A non-transitory computer-readable recording medium having embodied thereon an image processing program, the image processing program causing a computer to execute:

identifying the amount of movement of the image capturing unit that is based on vibration applied to the image capturing unit based on an output signal from a sensor for detecting vibration applied to the image capturing unit or a difference between frames of the acquired video;

detecting an object of interest from within frames of the acquired video;

identifying the distance from the image capturing unit to the object based on an output signal from a sensor for measuring a distance or the size of the object in a frame;

adjusting the strength of a correction vector for cancelling out shake caused by the vibration;

determining a cutout position for cutting out an image of a predetermined size from each of the frames of the acquired video and that moves the cutout position in accordance with the correction vector and separately determines an object cutout position and a background cutout position according to the strength of the correction vector;

combining image data of the object cut out from the object cutout position with image data of a background cut out from the background cutout position excluding the object, and setting the strength of the motion vector such that the smaller the distance to the object, the larger the strength of the correction vector.

* * * * *